Aug. 27, 1957  R. E. CARBAUH  2,804,608
FLAME DETECTOR SYSTEM
Filed June 30, 1954  3 Sheets-Sheet 2

INVENTOR
ROBERT E. CARBAUH

BY Scrivener & Parker
ATTORNEYS

INVENTOR
ROBERT E. CARBAUH

United States Patent Office 2,804,608
Patented Aug. 27, 1957

2,804,608

FLAME DETECTOR SYSTEM

Robert E. Carbauh, Medfield, Mass., assignor to Petcar Research Corporation, Washington, D. C., a corporation of New Jersey Application June 30, 1954, Serial No. 440,382

3 Claims. (Cl. 340—227)

This invention relates broadly to devices and systems for detecting the presence of fire and, more particularly, to such devices and systems which are responsive to the presence of actual flame rather than to the presence of light, elevated ambient temperature or any other manifestation such as water vapor or rain.

This invention is an improvement over the invention disclosed in Letters Patent No. 2,709,799 which discloses a flame detector system comprising a pair of spaced wires or electrodes which pass throughout the space to be monitored for the presence of flame. One of the wires, designated a transmitting wire, is supplied from a suitable source with an alternating voltage between the wire and ground having a frequency from which at least one harmonic of the frequency produced by the source is suppressed to a negligible value. The second wire is designated a receiving wire and is connected to a receiving means which is tuned to receive only that harmonic of the frequency produced by the source which is not present in the voltage supplied to the transmitting wire. In the system disclosed in the patent referred to only an actual flame bridging the wires supplies the missing harmonic to which the receiving unit is tuned, while other manifestations such as rain or water vapor provide this harmonic sporadically or not at all, thus eliminating the possibility of false alarm caused by rain and the like which has been a shortcoming of flame detectors of the prior art.

The present invention has for its principal object the simplification and improvement of the detector system of the patent by replacing the pair of spaced wires by a single electrode in a similar electrical system which is capable of discriminating between actual flame and other manifestations. By the provision of a single wire the weight of extra wiring and additional insulated mountings are eliminated thereby rendering the detector system of the present invention especially suitable for use in aircraft.

In its preferred embodiments, the present invention provides a system for flame detection comprising a single wire which is led through the space to be monitored and is insulated from ground. An alternating voltage is developed between this wire and ground which has a known fundamental frequency and from which one or more harmonics (except the ezro or first harmonic) are attenuated to negligible value. This electrode is connected at any point along its length, to receiving means tuned to reject the fundamental frequency and to accept only the attenuated harmonic or harmonics thereof. The flame is a non-linear impedance and when the flame bridges ground and the electrode, harmonics of the fundamental frequency appear between ground and the electrode. One of these harmonics is the one acceptable to the receiver. Suitable means, such as relays, which are actuated only upon reception of the harmonic frequency, operate means which in a well-known manner indicate the presence of flame. Sporadic signals which may be caused by rain, water vapor, elevated ambient temperatures or the like have amplitudes and durations of a distinctly different nature from that produced by flame, which amplitudes and durations are unacceptable to the receiver so that false alarms cannot be produced in the detector of the present invention.

An embodiment of the present invention is described in the following specification and illustrated in the accompanying drawings, in which.

Figure 1:
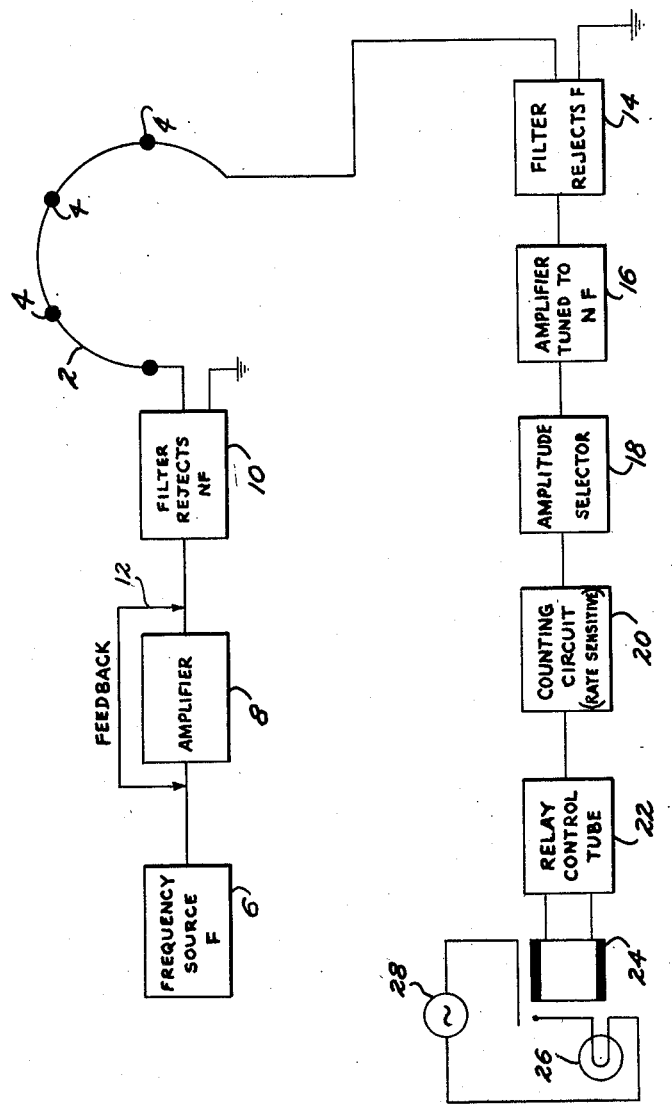
Fig. 1 is a schematic diagram of a flame detecting system according to this invention.

A schematic diagram of a flame detecting system constructed and operable in accordance with this invention is disclosed in Fig. 1 and comprises a single conductor which in the disclosed embodiment takes the form of an elongated bare wire 2 which is mounted on insulator supports 4 and is trained through the space to be monitored which may, for example, be the engine zone of an aircraft nacelle. A source of alternating voltage 6 is connected to one end of the transmitting wire 2 through an amplifier 8 and a filter 10, which attenuates from the energy supplied to the wire 2 at least one harmonic, which is not the zero or first harmonic, of the frequency generated by the source 6. The detector of the present invention is based on the concept of delivering to the electrode a fundamental frequency substantially free of the harmonic frequency component which would be induced therein by the impingement of actual flame thereon. As described in the co-pending application referred to above, actual flame impinging on an energized electrode and ground introduces a non-linear impedance between the electrode and ground thereby generating harmonic frequencies of substantially constant amplitude and duration one or more of which is detectable by suitable receiving means. To insure that the receiving means will not respond to an harmonic accidentally produced by the source and corresponding to the flame-generated harmonic, the null filter 8 is tuned to eliminate from the supply voltage the harmonic to which the receiver is tuned, thus insuring against source-produced false alarms. A feed-back circuit 12 may be associated with amplifier 8 if it is desirable to stabilize the operation of the amplifier against supply voltage changes and variations of the impedance from line to ground. It may be necessary to lower the output impedance for proper flame detection, if an accidental low resistance circuit appears on a portion of wire 2 far from the source.

The wire 2 is connected, at any point along its length, to receiving means comprising a filler 14, a tuned amplifier 16, an amplitude selector 18, a counting rate circuit 20, a relay control tube 22, and a relay 24 which is operable, when energized, to close the circuit through an indicating device such as lamp 26.

Figure 2:
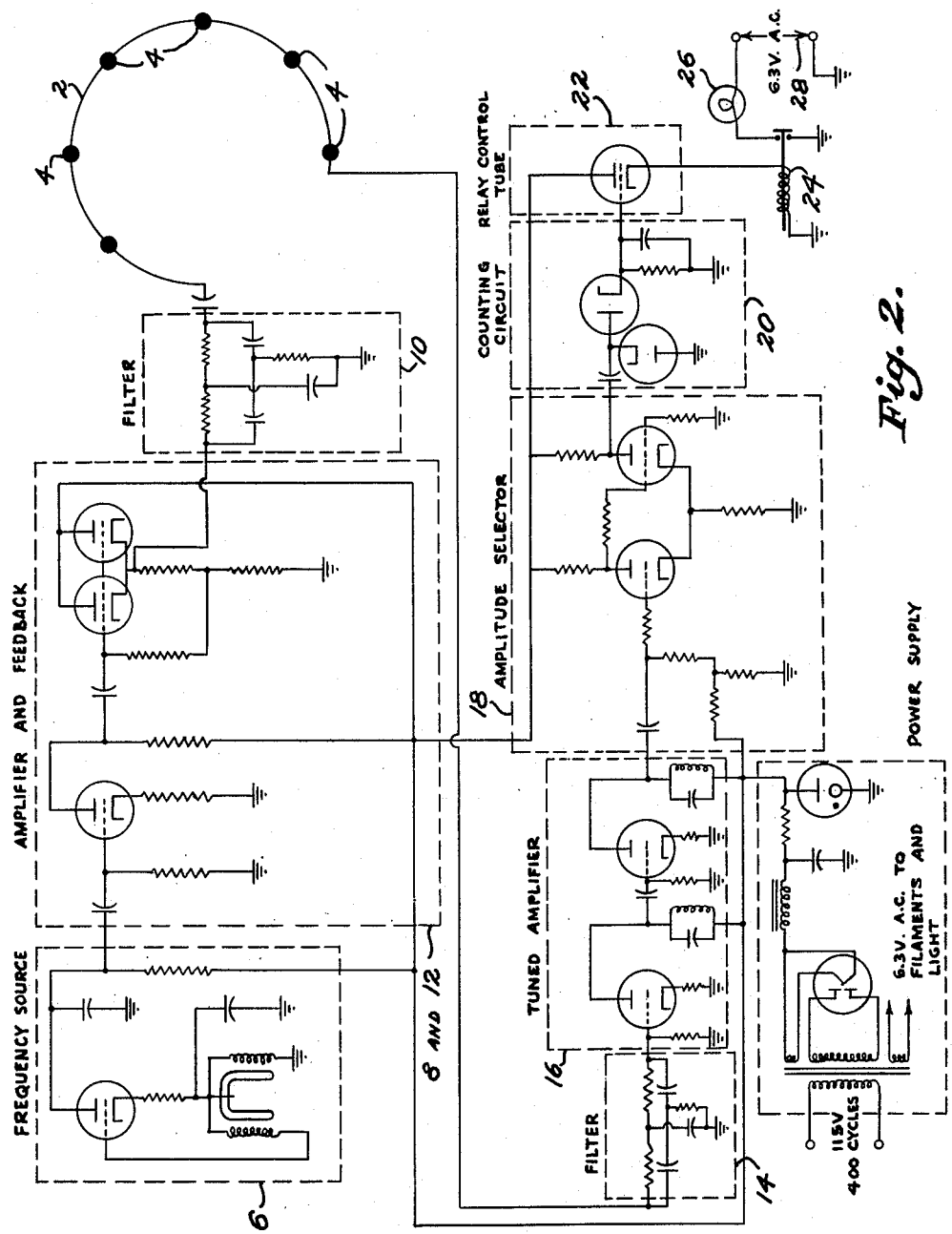
Fig. 2 is a circuit diagram of the system schematically disclosed in Fig. 1.

A circuit diagram of the system shown schematically in Fig. 1 is disclosed in Fig. 2 and it will be seen that the various elements of the schematic diagram are, in themselves, of conventional design. Thus the frequency source 6 may be of any known construction to produce an alternating fundamental frequency and, as such, may have the circuitry illustrated in Fig. 2. The amplifier 8 illustrated in Fig. 2 comprises an amplifier and a cathode follower which is a linear, low-gain amplifier with a low-impedance output but which may be any other suitable amplifier. The filter 10 which is illustrated is of the well-known twin-T type but may be any other form of filter which will be operative to attenuate an harmonic of the fundamental frequency which corresponds to a flame produced harmonic. The filter 14 of the receiver unit is also of the well-known twin-T type but may be any other form of filter which will be operative to attenuate to a negligible value the fundamental frequency of the source 6. The amplifier 16 is sharply tuned to the harmonic which is attenuated in the source by the filter 10 and which is supplied in the receiving unit by the impingement of actual flame on the electrode 2. The amplifier 16 is connected to the amplitude selector 18. The amplitude selection circuit 18 illustrated in Fig. 2 may be a conventional Schmitt trigger circuit, but may also be any other known circuit or device which will be operative to pass only signal or information voltages greater than some pre-determined value. The counting rate circuit 20 illustrated in Fig. 2 is of conventional design and, for the illustrated circuit, there may be substituted any known circuit which will respond only to signals continuing for a pre-determined length of time. The relay control tube 22, relay 24, lamp 26 and source 28 as shown in Fig. 2 are entirely conventional. A suitable power supply is provided for the transmitting and receiving circuits as shown in Fig. 2.

In the use and operation of the flame detector system provided by the invention, the electrode 2 is placed in a space in which flame may occur and which is to be monitored for flame. In the use of a typical embodiment of the invention, the electrode will take the form of an elongated bare wire which is trained throughout the space to be monitored. The source 6 supplies to the detector wire 2, through amplifier 8 and filter 10, an alternating fundamental frequency substantially free of a selected harmonic. Thus, if source 6 generates alternating voltage having fundamental frequency F, the voltage supplied to the detector wire 2 will have a like frequency without the harmonic $nF$, in which $n$ is neither zero nor 1 but is a whole number greater than 1. This harmonic is attenuated to a negligible value from the frequency of the source 6 by filter 10 and the fundamental voltage is amplified at 8 and stabilized by feed back circuit 12.

The detector wire 2 is connected, at any point along its length, to the filter 14 which rejects the fundamental frequency F while simultaneously accepting the harmonic frequency $nF$ to which amplifier 16 is tuned. If flame impinges on the wire 2, the harmonic $nF$ will appear and will be amplified in amplifier 16. The amplitude selector 18 is set to admit signals having at least a pre-determined amplitude which is so determined as to eliminate signals of the nature of noise, hum, etc. whereby the threshold of the selector 18 is such that these extraneous signals will never operate the indicator. It will be operated by signals of pre-determined level which are caused by impingement of flame on the detector wire 2. The output of the amplitude selector 18 is supplied to the counting rate circuit 20 which, while not necessary to the detection of a flame, is desired for the purpose of eliminating possible false alarms due to the effect of sporadic signals caused by the presence of water, water-vapor, rain and the like at the location of wire 2. The counting rate circuit may be so adjusted that it will pass only signals of some pre-determined duration, i. e. number of pulses of energy per unit of time, thus differentiating between signals producing a pre-determined number of pulses per unit of time, which are due to flame, and those producing a lesser number of pulses per unit of time which are due to other causes. The output of the counting rate circuit when flame is present is a direct current which is supplied to the relay control tube 22 and will operate the relay 24 to connect the lamp 26 to the source of power 28 and energize the same.

Suitable shielding for the leads of the described circuit may be provided if this is desired or necessary. Further, a failure circuit may be provided to indicate shorts, open circuits, failures of transmission and the like. One such failure circuit is illustrated and described in the co-pending application of Mahlon H. Norton filed July 23, 1953, Serial No. 369,773. In addition, a test circuit may be provided. This may be of any known construction but preferably is the type having means for selectively impressing on the detector wire 2 a signal identical to the signal produced by actual flame. Such a circuit is shown and described in Letters Patent No. 2,728,069.

Figure 3:
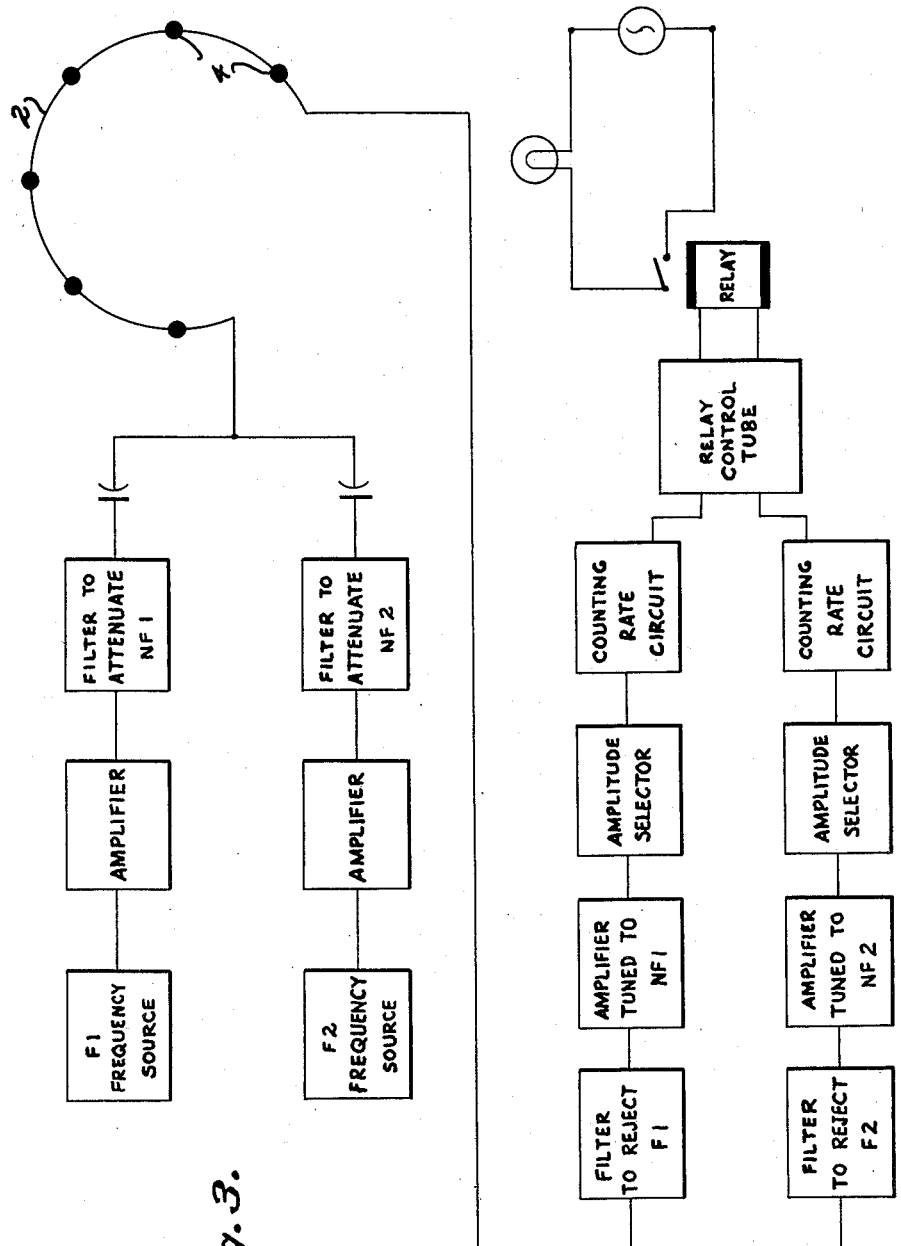
Fig. 3 is a schematic diagram of a modified system according to the invention.

If desired, a plurality of alternating voltages of different fundamental frequencies, from each of which one or more harmonics (except the zero or first harmonic of the fundamental frequency) has been attenuated to negligible value, may be developed between the conductor 2 and ground and upon impingement of a flame on the conductor and ground one or more of the attenuated frequencies will appear between the conductor and ground and will be separately received by receiving means connected to the conductor. A typical system of this type, for developing two fundamental frequencies, is illustrated in Fig. 3.

The invention described herein provides an improved flame detector of simple construction in which a single detector wire is utilized to sense the presence of flame and thereby actuate a receiver capable of discriminating between actual flame and flame-like manifestations, the receiver operating suitable indicating means only when actual flame impinges on the wire. By the use of a single wire the weight, bulk and difficulty of installation of a detector of the two wire type are reduced thus rendering the detector of the present invention especially suitable for flame monitoring of extremely confined spaces, such as those of an aircraft.

While certain embodiments of the invention have been disclosed, it will be apparent to those skilled in the art that other embodiments, as well as modifications of those disclosed, may be made without departing in any way from the spirit or scope of the invention, for the limits of which reference must be made to the appended claims.

What is claimed is:

1. An electrical flame detecting system comprising a single electrode arranged within a space to be monitored, means for developing between said electrode and ground an alternating voltage of a known fundamental frequency from which one or more harmonics have been attenuated to a negligible value, said harmonics being neither the zero nor the first harmonic of the fundamental frequency, and receiving means connected to said electrode and tuned to respond only to the attenuated harmonic or harmonics of the fundamental frequency whereby upon impingement of a flame on said electrode a signal of the attenuated harmonic frequency will appear between said electrode and ground and will be received in said receiving means, and indicating means operated upon such reception.

2. An electrical flame detecting system comprising a single electrode arranged within a space to be monitored, means for developing between said electrode and ground a plurality of alternating voltages of known fundamental frequencies from each of which one or more harmonics of the fundamental frequency has been attenuated to negligible value, none of such attenuated harmonics being the zero or first harmonic of the related fundamental frequency, receiving means connected to the electrode and tuned to respond only to the attenuated harmonics of the fundamental frequencies, whereby upon impingement of a flame on said electrode and ground a signal of the attenuated harmonic frequencies will appear between said electrode and ground and will be received in said receiving means, and indicating means operated upon such reception.

3. An electrical flame detecting system according to claim 1, in which said receiving means comprises, in addition, means for eliminating signals of an amplitude less than a predetermined value, and means for eliminating signals having less than a pre-determined number of pulses per unit of time.

References Cited in the file of this patent

UNITED STATES PATENTS 2,421,771   Browning _____ June 10, 1947